(12) United States Patent
Hori et al.

(10) Patent No.: US 7,546,541 B2
(45) Date of Patent: Jun. 9, 2009

(54) METHOD AND APPARATUS FOR ITERATIVE REFINEMENT OF GENERATED USER-INTERFACE MARKUP

(75) Inventors: Masahiro Hori, Kanagawa-ken (JP); Kouichi Ono, Tokyo (JP); Lawrence David Bergman, Mount Kisco, NY (US); Guruduth Somasekhara Banavar, Yorktown Heights, NY (US); Danny Soroker, Larchmont, NY (US)

(73) Assignee: International Business Machines Corporation, Armonk, NY (US)

( * ) Notice: Subject to any disclaimer, the term of this patent is extended or adjusted under 35 U.S.C. 154(b) by 735 days.

(21) Appl. No.: 10/316,257

(22) Filed: Dec. 10, 2002

(65) Prior Publication Data

US 2004/0109024 A1 Jun. 10, 2004

(51) Int. Cl.
G06F 3/00 (2006.01)
(52) U.S. Cl. ............... 715/762; 715/234; 715/235; 715/243; 715/248; 715/763
(58) Field of Classification Search ............ 715/517, 715/522, 530, 762, 763
See application file for complete search history.

(56) References Cited

U.S. PATENT DOCUMENTS

| | | | | |
|---|---|---|---|---|
| 5,574,846 | A * | 11/1996 | Yoshimura et al. | 345/418 |
| 5,890,181 | A * | 3/1999 | Selesky et al. | 715/530 |
| 6,061,697 | A * | 5/2000 | Nakao | 715/513 |
| 6,202,072 | B1 * | 3/2001 | Kuwahara | 715/513 |
| 6,377,964 | B1 * | 4/2002 | Sano | 715/530 |
| 6,496,202 | B1 * | 12/2002 | Prinzing | 715/762 |
| 6,651,069 | B2 * | 11/2003 | Aoyama et al. | 707/101 |
| 6,728,935 | B1 * | 4/2004 | Uchijima et al. | 715/210 |
| 6,731,309 | B1 * | 5/2004 | Unbedacht et al. | 715/765 |
| 6,922,810 | B1 * | 7/2005 | Trower et al. | 715/256 |
| 6,950,984 | B2 * | 9/2005 | Hori et al. | 715/229 |
| 6,957,417 | B2 * | 10/2005 | Turner et al. | 717/108 |
| 6,993,710 | B1 * | 1/2006 | Coad et al. | 715/511 |
| 7,134,081 | B2 * | 11/2006 | Fuller et al. | 715/735 |
| 7,174,286 | B2 * | 2/2007 | Martin et al. | 703/22 |
| 7,370,315 | B1 * | 5/2008 | Lovell et al. | 717/100 |
| 2001/0049704 | A1 * | 12/2001 | Hamburg et al. | 707/530 |
| 2002/0109734 | A1 * | 8/2002 | Umezu et al. | 345/846 |
| 2003/0007006 | A1 * | 1/2003 | Baar et al. | 345/767 |

OTHER PUBLICATIONS

Tyler, Dennise, "Sams Teach Yourself Microsoft FrontPage 2000 in 21 Days", Aug. 1999, Sams Publishing, p. 9-12, 66, 69, 70, 76, 160, 279, 431-440.*

Kurlander, et al. "Editable Graphical Histories", IEEE Workshop on Visual Languages, Oct. 10, 1988, p. 127-134.*

(Continued)

*Primary Examiner*—Tadesse Hailu
*Assistant Examiner*—Alvin H Tan
(74) *Attorney, Agent, or Firm*—Douglas W. Cameron; Anne Vachon Dougherty (57) ABSTRACT

A method and system for applying a method for iterative refinement of a presentation including (a) a developer creating a high-level representation of the user interface; (b) automatically generating a concrete user interface markup from the high-level representation; (c) the developer editing the concrete generated markup and saving the edits to an edit history; (d) the developer editing the high-level representation; (e) automatically re-generating a concrete markup from the edited high-level representation; and (f) automatically or interactively applying the edit history to the concrete markup to produce an updated markup.

17 Claims, 11 Drawing Sheets

OTHER PUBLICATIONS

Myers, et al. "Reusable Hierarchical Command Objects", Proceedings of CHI 96 Human Factors in Computing Systems, Apr. 13, 1996, p. 260-267.*

Berlage, "A Selective Undo Mechanism for Graphical User Interfaces Based on Command Objects", ACM Transactions on Computer-Human Interaction, vol. 1., No. 3, Sep. 1994, p. 269-294.*

* cited by examiner

| Confirmation_1.jsp | Login | X | hopi-controller.xml |

Login_1.jsp - Login page | BODY * | Standard *

Hopi Bank write | form | Username: [____]
Password: [____]
Logon [__]

<form:form action ="doLogin" method="post">

Design | Source | Preview

| Confirmation_1.jsp | 📋 Login | X | 🗂 hopi-controller.xml |

Login_1.jsp - Login page

Hopi Bank

| write | form | Username: _________ |  | BODY * | Standard * |

Password: _________ Logon

<form:form action="doLogin" method="post">

| Design | Source | Preview |

Login_1.jsp - Login page *  | Login  x | hopi-controller.xml | BODY * | Standard *

SimpleLogon

Sample Bank write | form BR

Username: BR

Password: BR

Logon

Design | Source | Preview

| X tweakerlib.twl | 📋* Login | X | | |
|---|---|---|---|---|
| Login_1.jsp - Login page * | | | BODY * | Standard * |

*Sample Bank*

[write] [form BR↵]

Username: ______ BR↵

Password: ______ BR↵

[Logon]

| Design | Source | Preview |

| tweakerlib.twl | Login × |
|---|---|

Login_1.jsp - Login page *

SimpleLogon

Hopi Bank write | form | Username: | Password:
Logon

HOPI BANK

BODY * | Standard *

Design | Source | Preview

720

METHOD AND APPARATUS FOR ITERATIVE REFINEMENT OF GENERATED USER-INTERFACE MARKUP

FIELD OF THE INVENTION

The present invention relates to application development tools for computer applications; and, more particularly, relates to a method and apparatus for enabling iterative refinement of a generated user interface markup in a way that refinements are not lost upon re-generation of the markup.

BACKGROUND OF THE INVENTION

The automatic generation of desired results based on user's editing actions has been investigated in the literature of "programming by example" or "programming by demonstration". Relevant articles include H. Lieberman: Programming by example. *Communications of the ACM*, Vol. 43, No. 3, pp. 73-74 (2000), and Allen Sypher et al. (Eds.): *Watch What I Do: Programming by Demonstration*. pp. 1-11, The MIT Press, Cambridge, Mass. (1993). The motivation behind the programming by example approach is that a user's knowledge can be exploited somehow for the creation of a program to perform a task repeatedly, if the user knows how to perform the task manually. The task in the automatic generation of an edited markup is to generate an updated markup from a concrete markup and the transformation of such concrete markup is quite easy when it can be done on a graphical editor. There are works on the generation of transformation scripts for a concrete markup including K. Ono, T. Koyanagi, M. Hori, and G. Kondoh: Creation of Rendering Style for Structured Documents by Demonstration. Filed as Docket JP919990313JP1 (2000) and T. Koyanagi, K. Ono, and M. Hori: Demonstrational interface for XSLT stylesheet generation. *Proceedings of Extreme Markup Languages* 2000, pp. 197-211, Montreal, Canada (2000). However, the existing works only deal with the script generation, and do not consider the idea of iterative refinement.

Existing automatic refinement can be done by standardized stylesheet languages such as Cascading Style Sheet (CSS) and XSL Transformation Language (XSLT). Relevant articles include those found in "Cascading Style Sheets, level 1. W3C Recommendation," which can be accessed on the web at w3.org/TR/REC-CSS1 (1996), and "XSL Transformations (XSLT) Version 1.0. W3C Recommendation," which can be accessed at the web page at w3.org/TR/xslt (1999). The CSS can be used only for the specification of presentation properties (e.g., font face, margin width, and textual alignment), but does not allow transformation or structural changes of a concrete markup and does not suffice for full-featured iterative refinement. On the other hand, XSLT allows arbitrary transformation of concrete markup including structural changes. However, the XSLT is a language designed for automatic transformation rather than interactive refinement. Actually, the current XSLT engines does not allow the recording of transformation history, and cannot be used for applying a recorded edit history to a concrete markup to produce an updated markup.

It is, therefore, an objective of the present invention to provide a system and method for iterative refinement of generated user-interface markups.

SUMMARY OF THE INVENTION

The present invention provides a method and apparatus for enabling iterative refinement of generated user interface markup in a way that refinements are not lost upon re-generation of the markup. The system and method are intended for use, for example, in application development systems in which a high-level representation of the user interface is developed, and from it one or more concrete markup representations are automatically generated. In such systems there is often the need to allow the developer to edit the high-level representation as well as to refine the generated concrete markup. In these situations, a special mechanism is necessary to avoid loss of the refinements when a concrete markup is re-generated. Such a mechanism is provided by the current invention.

The method in the present invention includes the steps of (a) a developer creating a high-level representation of the user interface; (b) automatically generating a concrete user interface markup from the high-level representation; (c) the developer editing the concrete generated markup and saving the edits to an edit history; (d) the developer editing the high-level representation; (e) automatically re-generating a concrete markup from the edited high-level representation; and (f) automatically or interactively applying the edit history to the concrete markup to produce an updated markup.

BRIEF DESCRIPTION OF THE DRAWINGS

The invention will now be described in greater detail with specific reference to the appended drawings wherein.

DETAILED DESCRIPTION OF THE INVENTION

The present invention provides a system and method of saving a history of edits and allowing iterative refinement of one or a plurality of generated user-interface markups with the saved history. The system and method include means for performing and method steps of (a) a developer creating a high-level representation of the user interface; (b) automatically generating a concrete user interface markup from the high-level representation; (c) the developer editing the concrete generated markup; (d) the developer editing the high-level representation; (e) automatically re-generating a concrete markup from the edited high-level representation; and (f) automatically or interactively applying the edit history to the concrete markup to produce an updated markup.

It is important to note that steps (c)-(f) can be iterated multiple times. In step (a) the developer interacts with the application-development system to create a high-level representation of the user interface. This creation can be done through an editor, which may be graphical or textual. When done creating the high-level representation, the developer invokes a generation step (b), in which the system automatically generates a concrete user interface representation for markup (hereinafter referred to as the "markup") corresponding to the high-level representation. In step (c), the developer uses an editor to edit the concrete user interface markup. As part of the inventive process, the edits are saved as an edit history. For example, if, through this editor, the developer adds a widget or changes an attribute of an existing element, then this fact is recorded in the edit history. The editor is preferably a graphical editor that enables direct manipulation of the concrete user interface markup. An optional step may be included whereby the developer defines the scope of each edit to indicate if the edit should, in future iterations, be applied only for this page or presentation, be applied application-wide, or be applied across applications. Step (d) shows that the developer can continue modifying the high-level representation after having refined the concrete user interface markup in step (c). Any changes to the high-level representation must be carried through to any concrete user interface markups. Therefore, the developer invokes another generation step (e), for re-generating a concrete markup from the modified high-level representation. Note that step (e) is essentially equivalent to step (b). In step (f) the system applies the edit history to the newly generated concrete markup to produce an up-to-date markup. This step of applying the edit history may be fully automated, or may involve the developer in a variety of ways, such as having the developer specify a subset of the edit history to apply, or having the developer specify a preferred outcome when the result of applying an edit is ambiguous. If the developer has defined the scope of the edits previously, automatic application of edits is facilitated. However, an optional sub-step may be introduced at this time to allow the developer to verify or modify the scope of previous edits from the edit history prior to those edits being implemented.

Figure 1:
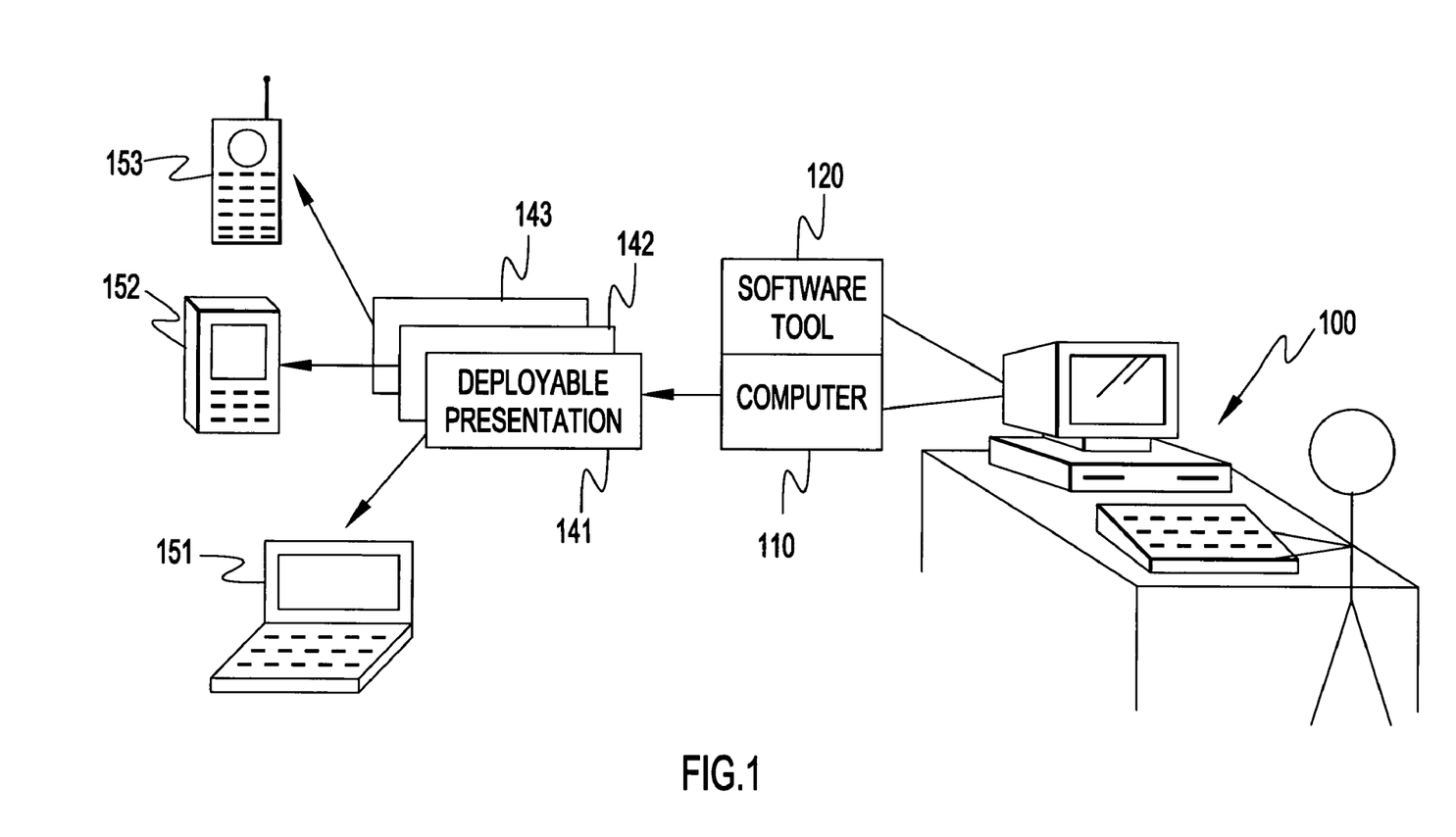
FIG. 1 provides a representative illustration of a system for implementing the present invention.

FIG. 1 provides a representative illustration of a system for implementing the present invention. An application developer (100) uses a computer system (110) which is executing a software tool (120). The software tool embodies the methodology described in this disclosure for creating, editing, and generating applications. As a result of usage, either through explicit user action, or through execution of programmed commands, the software tool generates a set of deployable presentations (141-143). Each of these applications is targeted to and deployed on a particular kind of device (151-153), such as the desktop computer, PDA, or cell phone as illustrated, tool kit (not shown), or user preference-tailored presentation.

Figure 2:
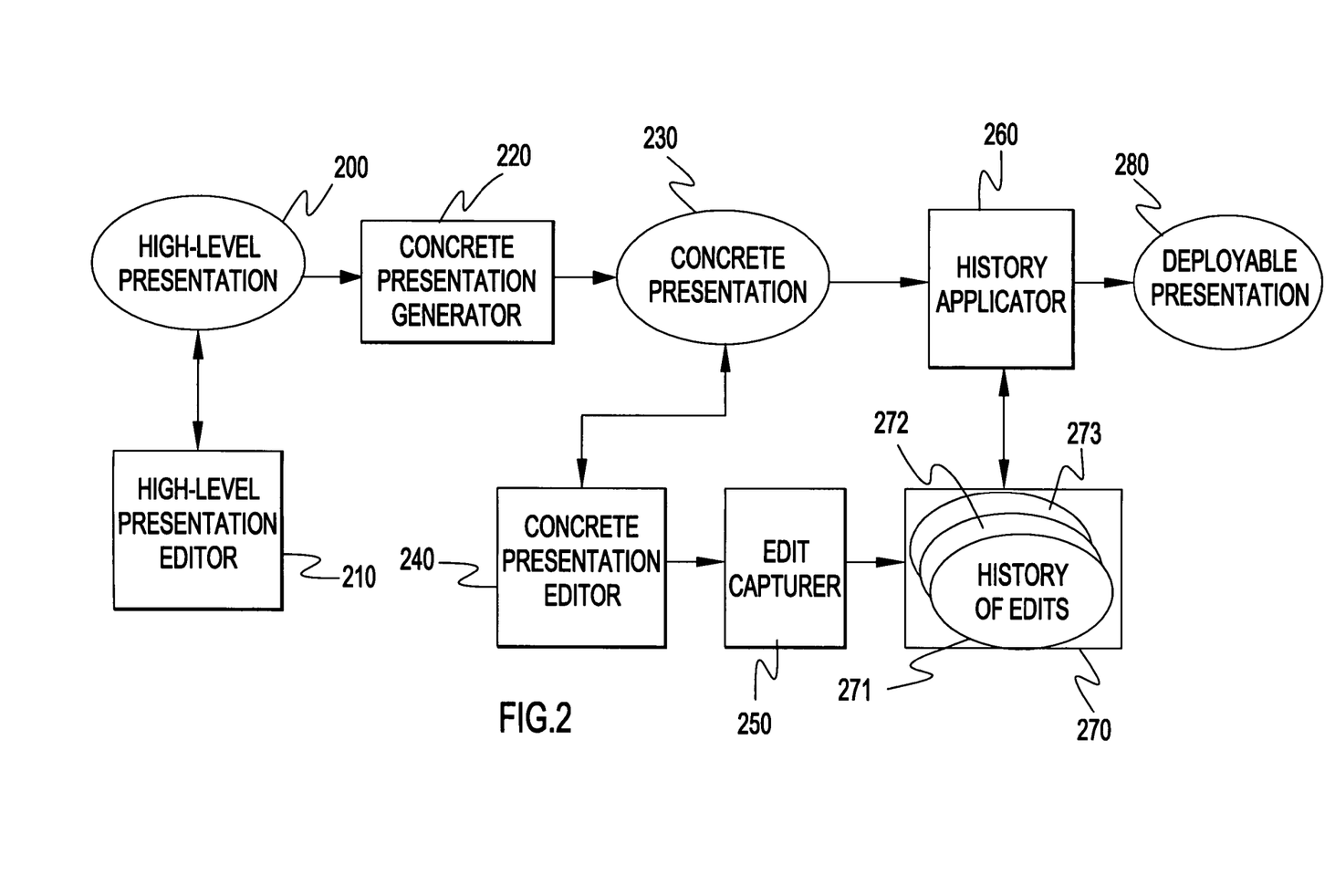
FIG. 2 provides a graphical representation of the architecture for implementing the present invention.

FIG. 2 provide a graphical representation of the architecture of the software tool. A high-level presentation (200) is created using a high-level presentation editor (210). The high-level presentation is an abstract user interface representation or data structure that describes the presentable entities within a user-interface. The data structure might, for example, consist of a hierarchical description of user interface elements such as input fields, text display areas, and groupings of elements. Xforms is an example of such an abstract description.

The high-level presentation editor (210) is used to create and manipulate the high-level presentation. The high-level presentation editor might be a drag-and-drop graphical editor for use in creating and editing abstract user-interface specifications, although other types of editors including text editors can be envisioned.

Once a high-level presentation has been created, a concrete presentation generator (220) automatically produces a concrete presentation (230). The concrete presentation generator is an automated component, and may use a variety of information from other sources such as device profile descriptions extracted from a device profile database. The concrete presentation is a device-specific representation of the visual appearance of the user interface, represented in a deployable manner, for example, as a set of HTML pages.

The concrete presentation can be edited using a concrete presentation editor (240). This can be a standard layout editor, for example IBM Websphere* Page Designer's visual HTML editor (*denotes that the term may be a trademark of the respective owner). Changes made within the editor are captured by an edit capture module (250). The edit capture component transcribes and records any changes made using the concrete presentation editor. Changes that are recorded might include: inserting a new user interface component, removing a user interface component, changing the position of a user interface component relative to other components, changing a property of a user interface component (such as size, color, font), and changing groupings of user interface components. The edit capture module can be tightly integrated with the concrete presentation editor (e.g., with the extreme case being that they are part of a single module), or loosely coupled, for example communicating through notification of Document Object Model (DOM) edit events.

The captured edits are stored at a storage location (270) as a history of edits (pages 271-273). A variety of textual or binary representations of this edit history can be envisioned. In the simplest case there will be a time-ordered stream of user actions, recording the entities that were modified and the actions taken on them. More involved structures can be envisioned. It is to be noted that entries in the edit history need not have a one-to-one correspondence with user actions in the concrete presentation editor. For example, the edit capture module might make inferences and impose semantic structure on the edit history, storing additional information beyond the "raw" edit actions. Similarly, sets of user actions might be condensed into more compact semantic representations. As noted above, the user may optionally define the scope for edits at this time. Accordingly, edits can be stored with metadata indicating that the edits should be applied as page-specific or presentation-specific edits, as application-wide edits, or as cross-application edits. When the user inputs an edit to the concrete presentation editor, the user may be prompted to define or select the scope for the edit. Thereafter, the edit will be applied to the concrete presentation, followed by storing the edit, along with the scope defined for that edit, in the edit history.

Once a history of edits has been recorded, it is available for use in updating future concrete presentations (as described with reference to FIG. 3). A history applicator module (260) reads the history, and applies the edits to a concrete presentation, automatically applying changes (e.g., removal of elements, insertion of elements, property changes, etc.) consistent with the user-defined edit scope, if available. The output of the history applicator is a deployable presentation. Typically the deployable presentation will be represented in exactly the same format (e.g., HTML) as the concrete presentation, although transformation of representations is also possible at this stage. It is to be noted that the history application module may be a component of the concrete presentation editor.

The preferred embodiment will allow a user to selectively apply the edit history. One implementation provides the user with a display of the stored edit history, with edits and optional edit scope information. The user may define or modify previously-defined edit scope. Further, the user may select which edits from the edit history are to be applied.

Figure 3:
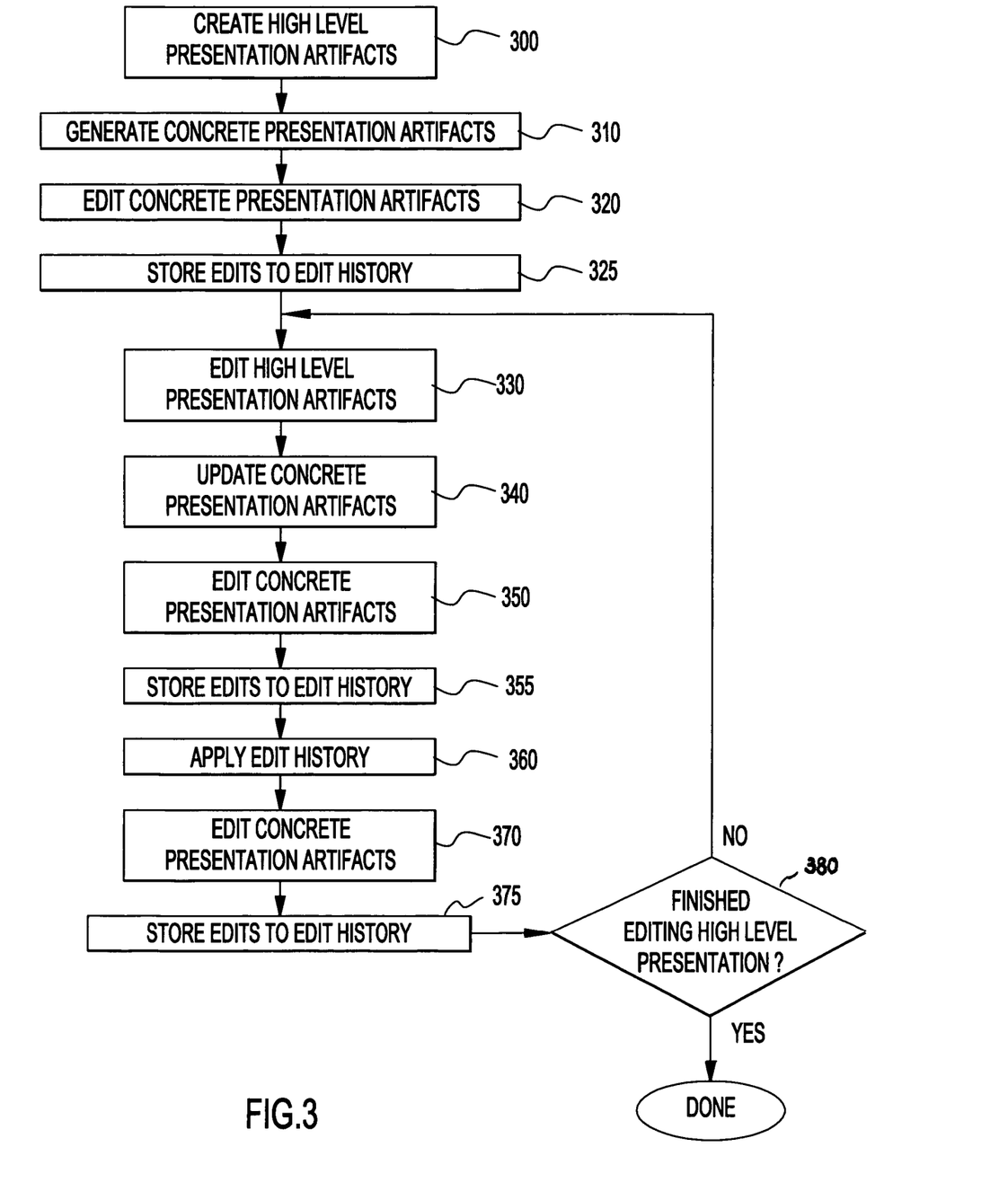
FIG. 3 illustrates a representative process flow for implementing the iterative refinement of the present invention.

FIG. 3 describes the process flow for iterative refinement of generated user-interface artifacts as described in this invention. A user begins the process by creating 300 high-level presentation artifacts using the High-level Presentation Editor 210. A high-level presentation 200 artifact typically captures the elements of user interaction using a representation such as XForms (an emerging W3C standard). For example, a high-level presentation artifact named "shipping.xml" could consist of the following elements:

1. A header element containing the text "Shipping"
2. A list element displaying the current contents of the shopping cart
3. An input element for entering the street address and city
4. A select one element for picking a single state
5. A submit element for confirming the shipping request From the above high-level presentation artifact, the Concrete Presentation Generator 220 can go through step 310 of generating a concrete presentation artifact 230 for a particular target platform. For the above example, step 230 could generate a concrete presentation artifact "shipping_html.jsp" as a Java Server Pages* document using the HyperText Markup Language (HTML). The page would contain concrete HTML JSP tags that can be deployed to an execution environment. Alternatively, the above high-level presentation artifact could have been converted into a different concrete presentation artifact such as a JSP using the Wireless Markup Language (WML), "shipping_wml.jsp".

In step 320, the user can edit the generated concrete presentation artifact. For example, the designer can add an image to the generated "shipping_html.jsp" file, or change the background color, or change the header text from "Shipping" to "Shipping Information". These edits are performed using the Concrete Presentation Editor 240, that is part of the present invention. The Edit Capturer component 250 stores the edits in a separate location known as the History of Edits 270 at step 325. The optional step of defining the scope for edits may be done as the edits are being input by the user at 320, as the edits are being stored at 325, or at the time when the edits are to be applied, at step 360.

In step 330, the user can use the High-level Presentation Editor 210 to edit the original high-level presentation artifact. In the above example, the user can modify the contents of "shipping.xml" to include separate input elements for the street address and the city. After these edits, the tool can execute step 340 for automatically re-generating the concrete presentation artifacts. At this point, the user can optionally edit the regenerated artifacts, as shown in step 350, with the edits being stored in the edit history at step 355. Again, the optional defining of edit scope can be performed in association with the editing at 350 or the storing at 355.

The key aspect of this invention is shown in step 360. In this step, the user can apply the previous History of Edits 270 that was stored in step 320 to the current concrete presentation artifact. This operation merges the previous edits with the current elements within the concrete presentation artifact generated at 340.

Following this, the user can continue editing the concrete presentation artifact as shown in step 370. The edit history of either step 350 or of step 370 can be stored as separate instances of the History of Edits, as shown in steps 355 and 375 respectively. The user may, again, define the scope of the edits as the edits are being applied and/or stored. The separate edit instances can be reapplied selectively by the user. Step 360, of applying the edit history, can be done automatically or with user interaction. One preferred embodiment includes user interaction in the sub-steps of displaying the edit history to the user, allowing the user to select or modify the scope of the previous edits, and allowing the user to select which of the edits is to be applied, to the instant concrete presentation (page-specific or presentation-specific edits), across applications, or application-wide.

Step 380 captures the fact that this is an iterative process of refinement. That is, the user can iterate from step 330 to step 370 until he or she is satisfied with the final outcome of the presentation.

A key aspect of this invention is that there can be multiple named histories of edits that can be reapplied in the future. Furthermore, these edit histories can be applied to concrete presentation artifacts different from that from which it was originally generated (e.g., edits having a defined scope of cross-application). Finally, portions of any edit history can also be applied selectively to any concrete presentation artifact, as detailed above.

Figure 4A:
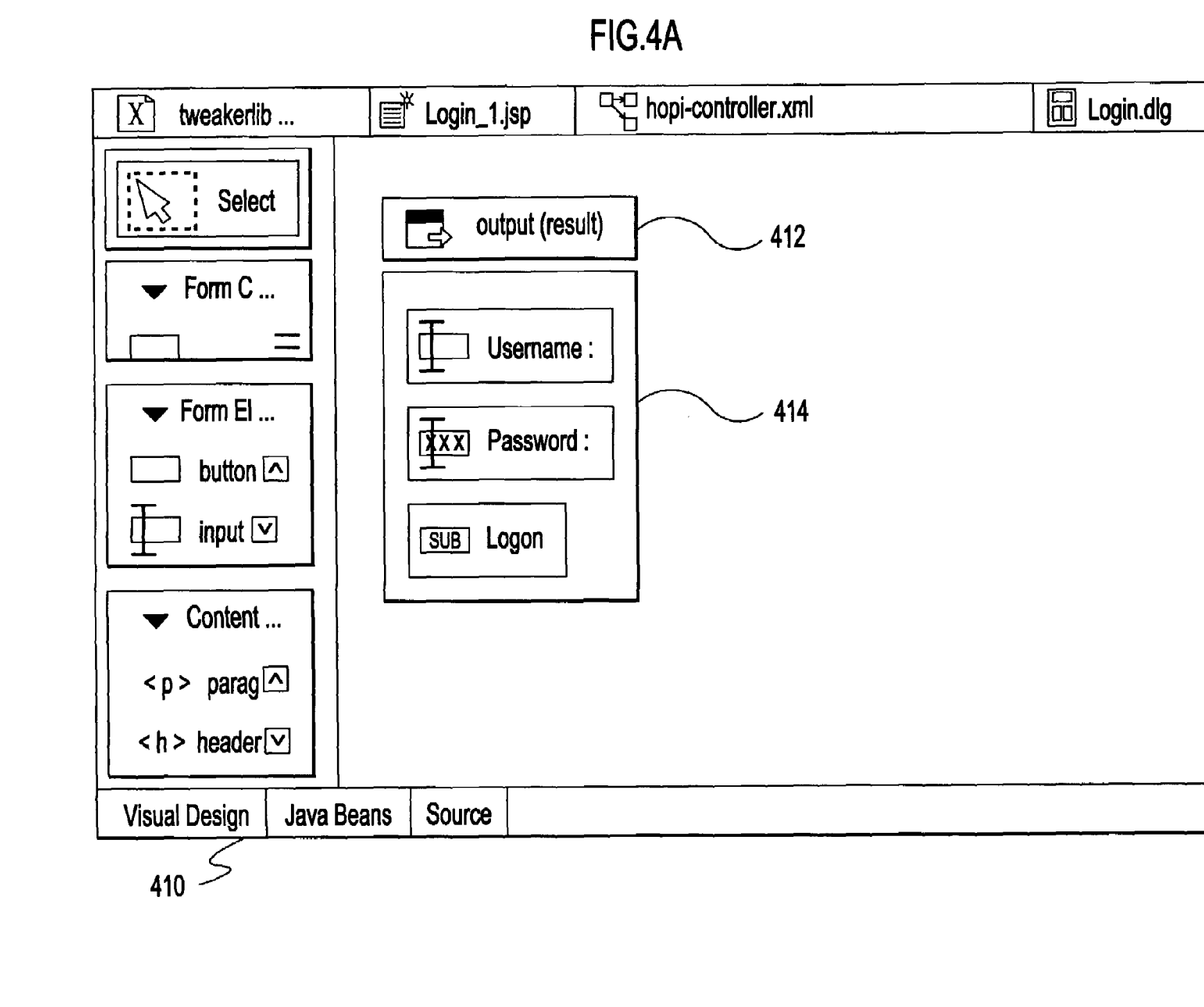
FIGS. 4A-4B illustrate examples of presentation artifacts.
Figure 4B:
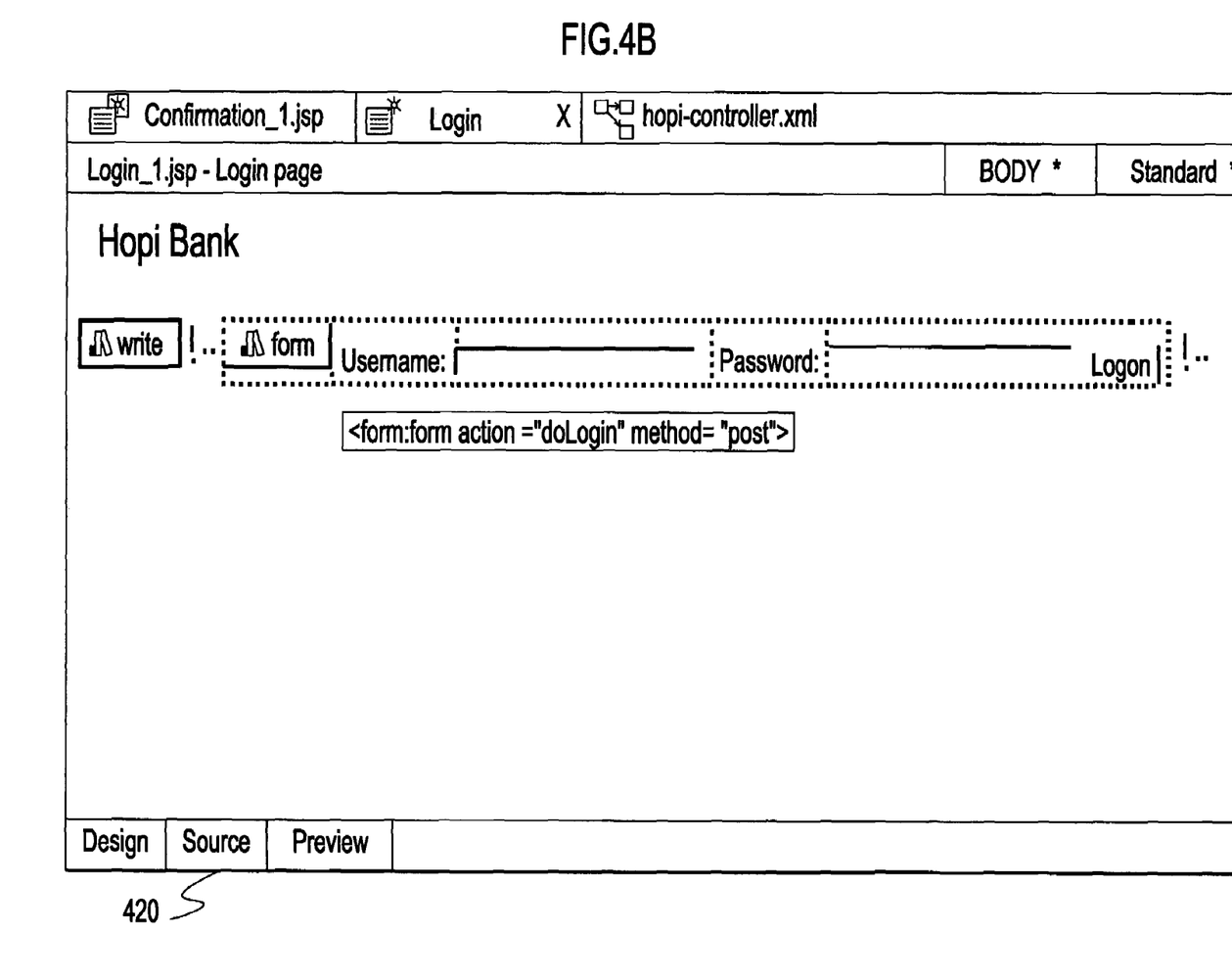

FIGS. 4A and 4B give examples of presentation artifacts. FIG. 4A shows an example of editing a high-level presentation 410. FIG. 4B illustrates an example of editing a low-level presentation, or concrete, 420. The high-level presentation 410 has only information about components used for this presentation and logical relationships between them. In this example, the presentation has an output label 412 and an input form 414. The input form 414 consists of three components, an input element labeled "Username:", an input element labeled "Password:" (and its input string must be hidden), and a button labeled "Logon". The low-level presentation 420 has information about layout of components and decoration of them that the high-level presentation does not have. The components in the high-level presentation are translated into components in the low-level presentation. For example, the input element labeled "Username:" is translated to the <input> element and the text "Username:".

Figure 5A:
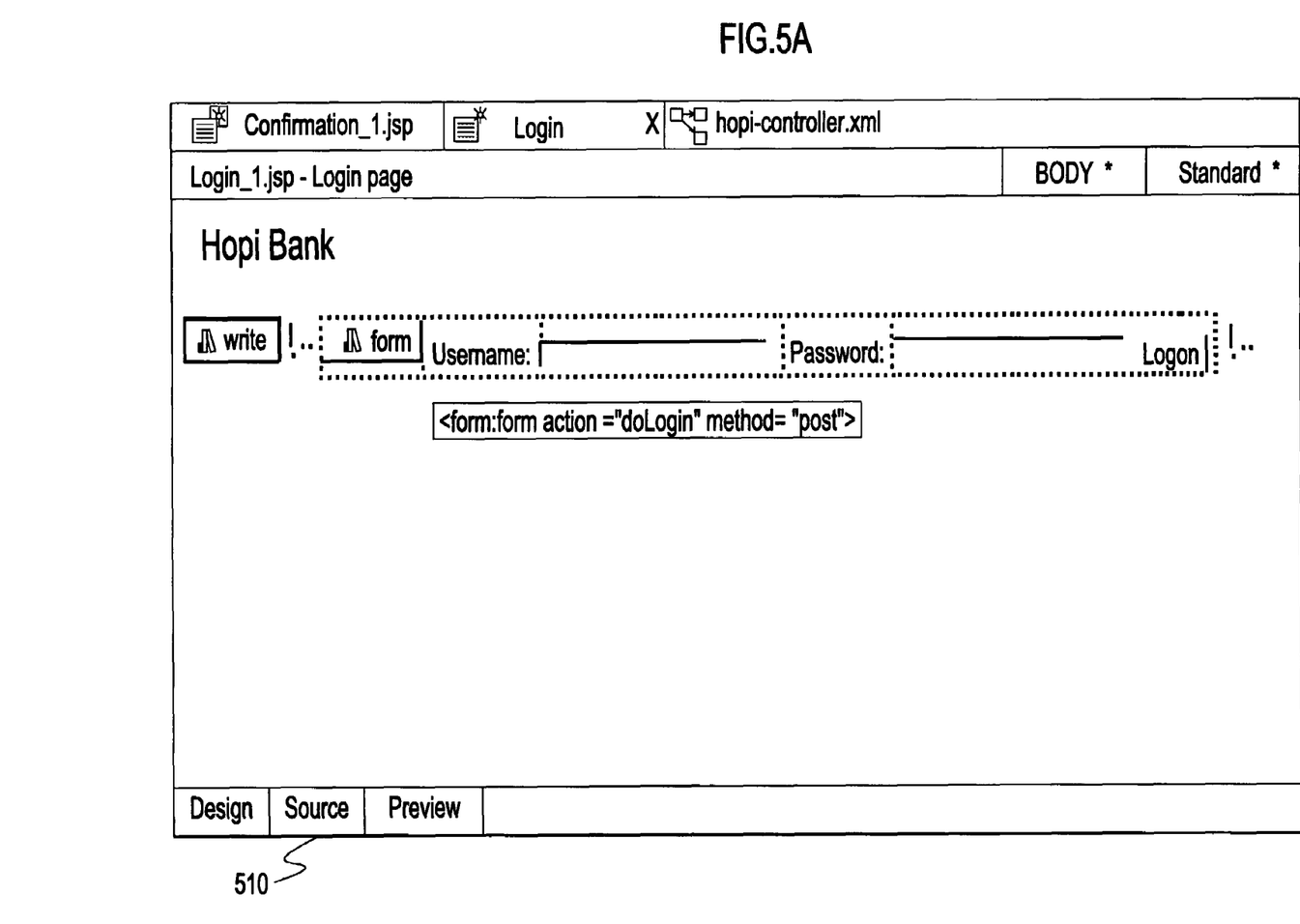
FIGS. 5A-5C illustrate concrete presentation refinement in accordance with the present invention.
Figure 5B:
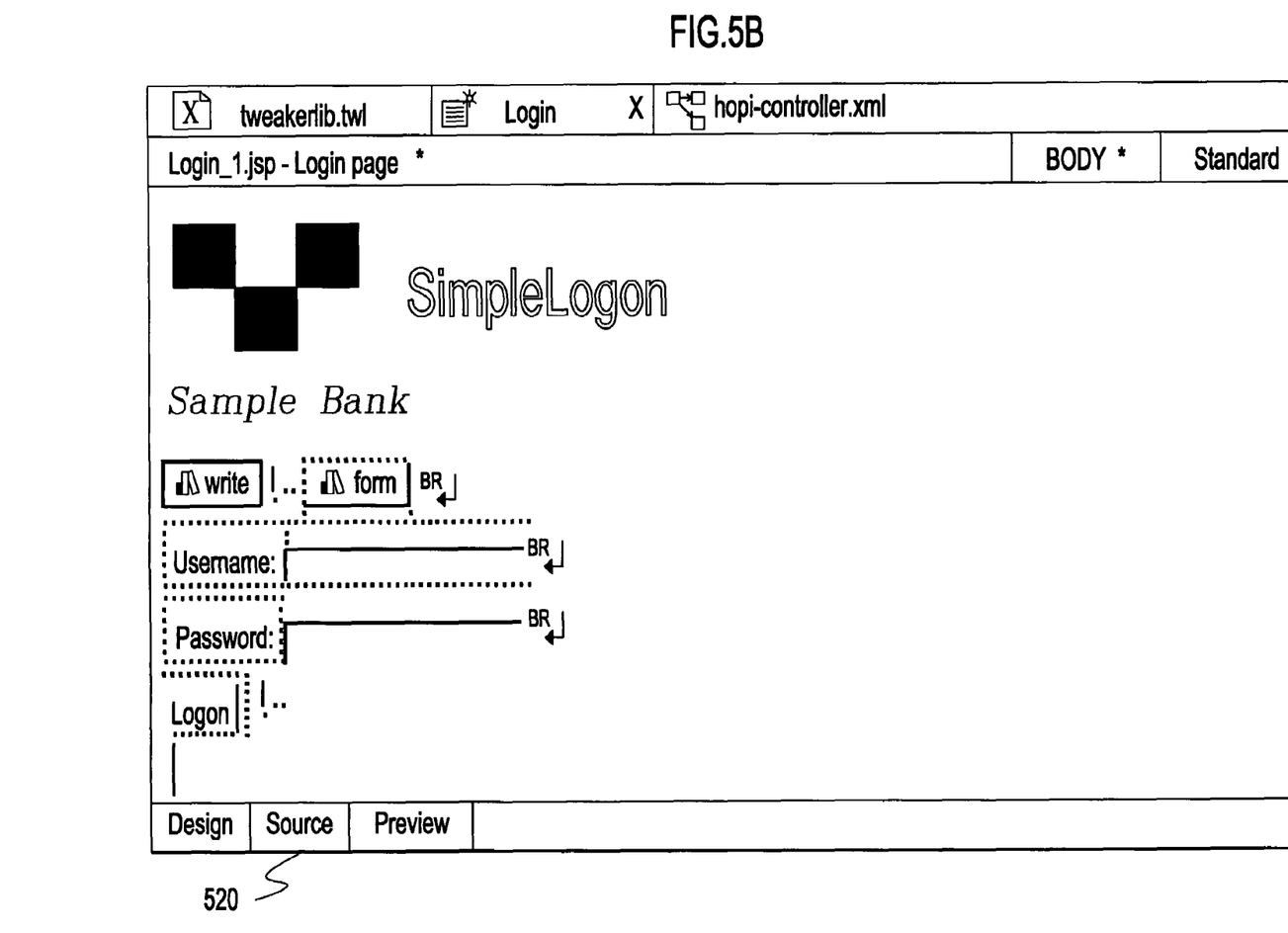
Figure 5C:
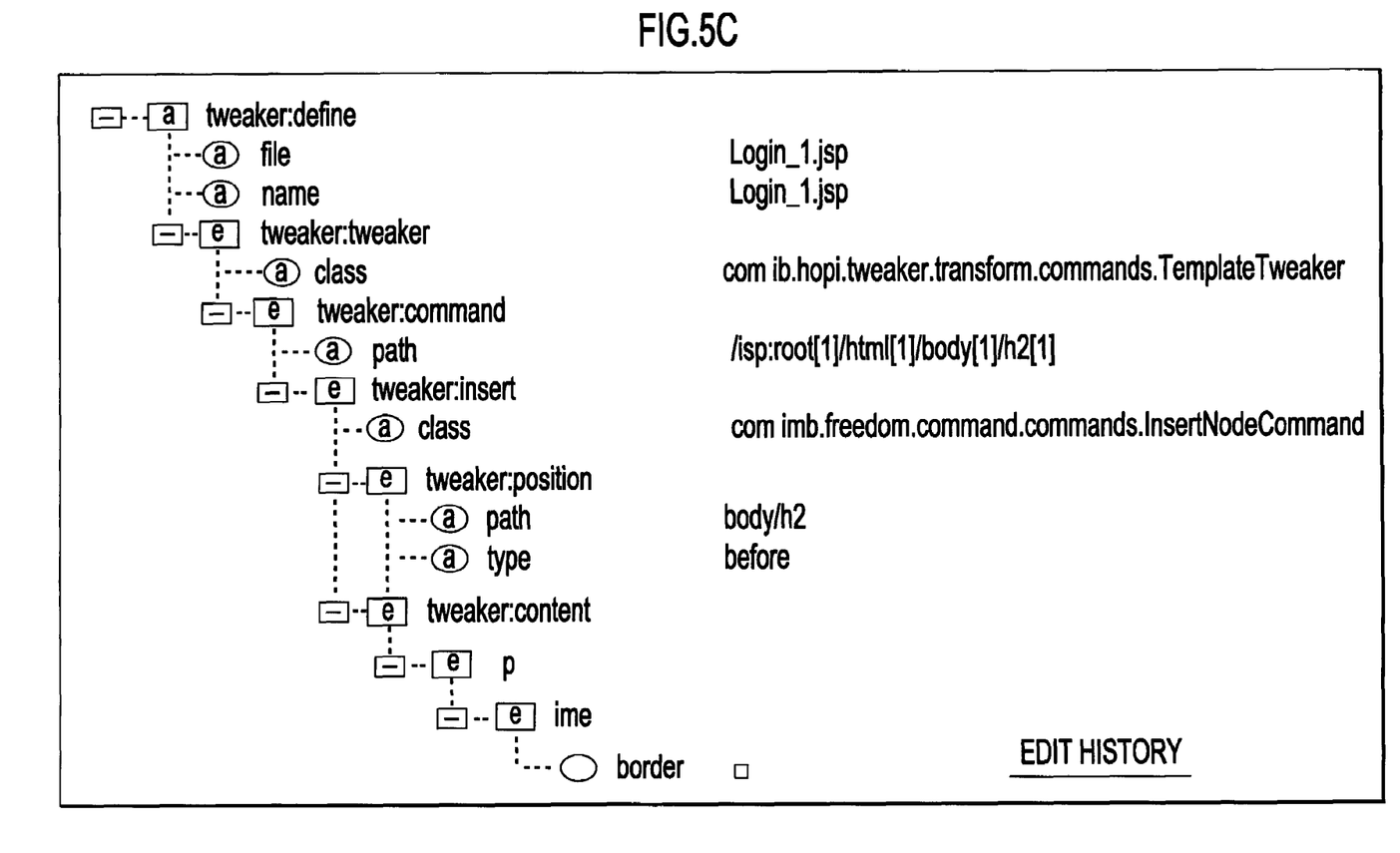

FIGS. 5A-5C gives examples of concrete presentation refinement. FIG. 5A, labeled "Before", is an example of editing a low-level presentation 510 before its refinement. FIG. 5B, labeled "After", is an example of editing a low-level presentation 520 after its refinement. By using the concrete presentation editor, also known as a refinement editor, the user can refine the "Before" presentation as the initial document, and the user will get the "After" presentation as the required result. The refinement editor records an edit history of the presentation refinement, and it will be saved for re-application. FIG. 5C illustrates an edit history 530 which reflects the changes made to the low-level presentation 510 to produce the low-level presentation shown at 520.

Figure 6:
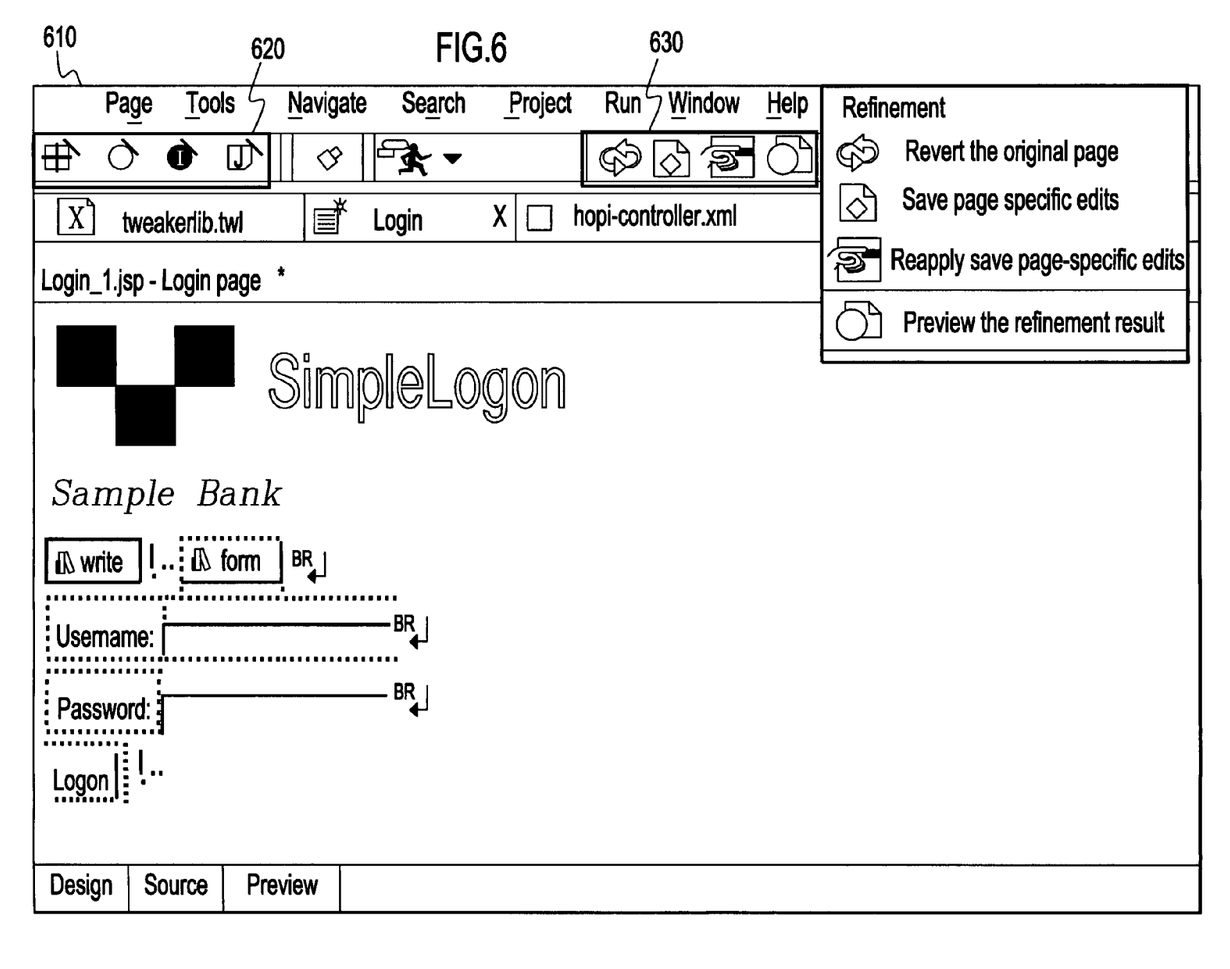
FIG. 6 illustrates a representative history applicator tool interface in accordance with the present invention.

FIG. 6 illustrates a history applicator tool user-interface 610. The four menu items shown in box 620 are commands of the history applicator tool. The four icon buttons shown in box 630 correspond to the menu items. As explained above with reference to FIGS. 4A-4B, the edit history of a low-level presentation would be saved if the presentation had been previously refined. After saving the edit history, when the refinement editor is activated to edit a low-level presentation again, the refinement editor can automatically reapply the saved edit history to the presentation in order to reproduce the result of the previous editing, so that the user can continue editing. In a preferred embodiment, the user can direct the refinement editor to selectively apply the edit history. The user can also revert to the original presentation in order to work over creating the new edit history. After editing the presentation, the user can save the edit history. Further, the user can reapply the saved edit history into the presentation. In a preferred embodiment, the user can confirm the refinement by previewing the result of applying the edit histories.

Figure 7A:
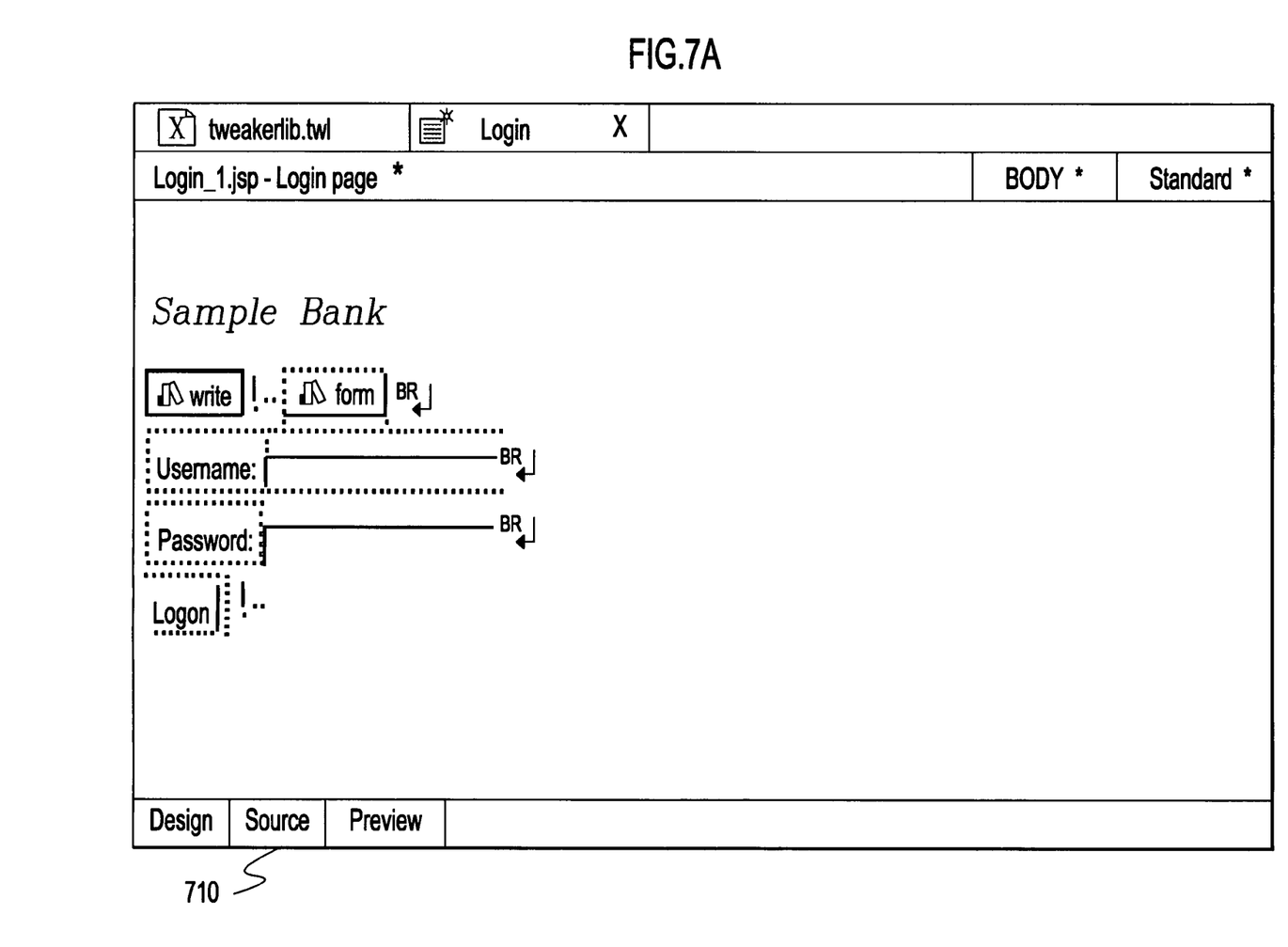
FIGS. 7A-7B illustrate page-specific and application-wide edits in accordance with the present invention.
Figure 7B:
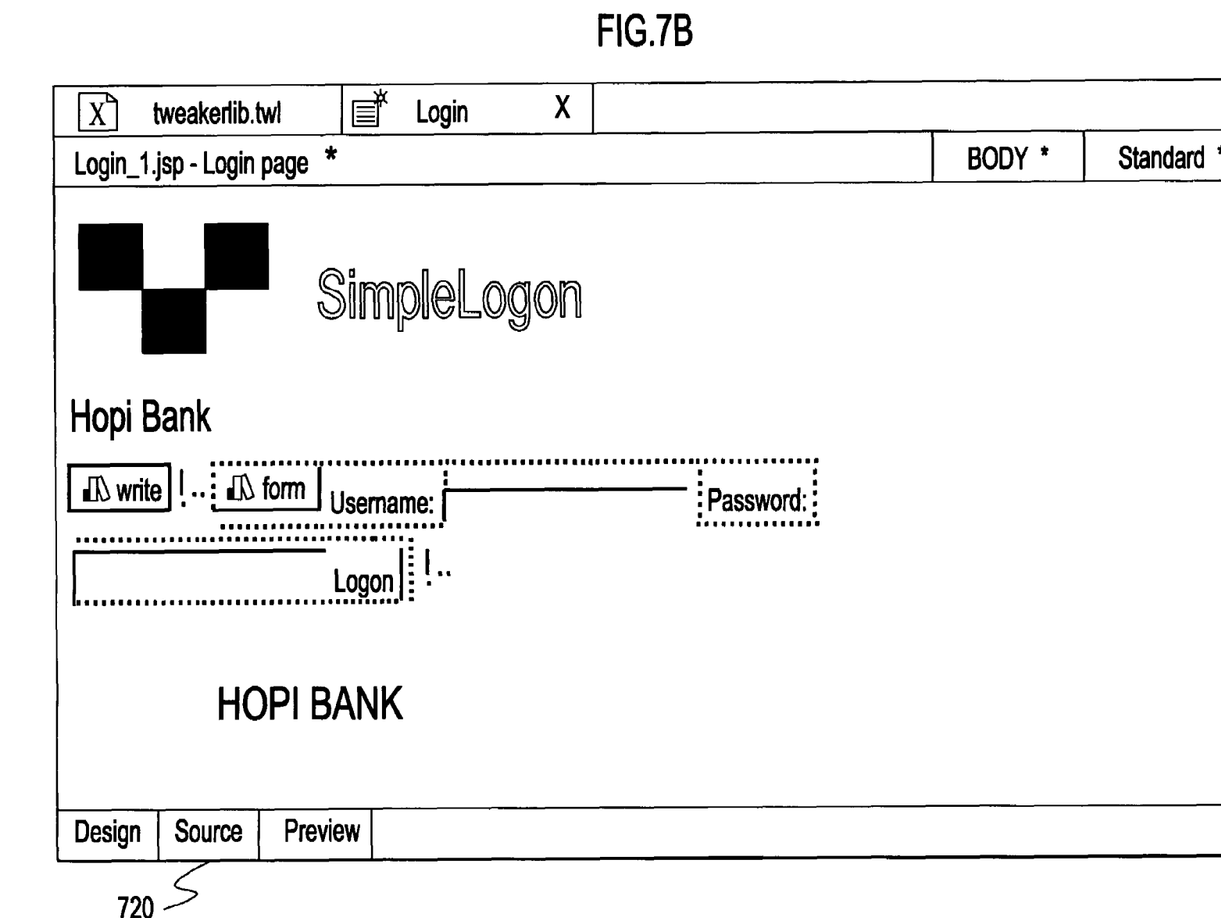

FIGS. 7A-7B illustrate page-specific edits at 710 and application-wide edits at 720. The page-specific edits are only for the page or the single concrete presentation. Its edit history will be applied to the presentation itself. The application-wide edits are for all pages (presentations) in the application. The edit history of application-wide edits will be applied to all pages and will be composed to apply each presentation in order to get the result of refinement.

The invention has been detailed with reference to several preferred embodiments. It will be understood by one having skill in the relevant art that modifications can be made to the detailed embodiments without departing from the spirit and scope of the invention as set forth in the appended claims.

What is claimed is:

1. A method for providing iterative development of a presentation being generated, comprising the steps of:
    creating a high level presentation;
    automatically generating a first concrete presentation from said high-level presentation;
    editing said first concrete presentation by performing two or more editing steps specified by user input on said first concrete presentation to produce an edited first concrete presentation;
    storing a sequential history of said two or more editing steps in an edit history;
    modifying at least one of components and relationships between components represented in the high level presentation based on user input;
    automatically newly generating a successive concrete presentation based on said modifying of the high level presentation wherein said successive concrete presentation differs from said edited first concrete presentation; and
    automatically applying said sequential edit history without user input to perform said two or more editing steps previously performed on said first concrete presentation on said successive concrete presentation to generate an edited successive concrete presentation.

2. The method of claim 1 further comprising repeating said steps of modifying, automatically newly generating of a successive concrete presentation, and applying.

3. The method of claim 2 wherein said applying said edit history further comprises performing said two or more editing steps on at least one newly generated successive concrete presentation.

4. The method of claim 1 further comprising automatically modifying said edit history.

5. The method of claim 1 further comprising the step of specifying scope for each of said two or more editing steps as defined by user scope input and storing the scope with said edit history.

6. The method of claim 5 wherein said specifying of scope comprises identifying each editing step to be a page-specific, presentation-specific, application-wide or cross-application edit to be automatically applied to subsequently generated presentations without further user input.

7. A program storage device readable by machine tangibly embodying a program of instructions executable by the machine to perform a method for providing iterative development of a presentation being generated, said method comprising the steps of:
    receiving user input for creating a high level presentation;
    automatically generating a first concrete presentation from said high-level presentation;
    editing said first concrete presentation by receiving user input for performing two or more editing steps on said first concrete presentation to produce an edited first concrete presentation;
    storing a history of said two or more editing steps in a sequential edit history;
    modifying at least one of components and relationships between components represented in the high level presentation based on received user input;
    automatically newly generating a successive concrete presentation based on said modifying of the high level presentation wherein said successive concrete presentation differs from said edited first concrete presentation; and
    automatically applying said sequential edit history without further user input to perform said two or more editing steps previously applied to the first concrete presentation on said successive concrete presentation to generate an edited successive concrete presentation.

8. A system for iterative development of a presentation being generated, comprising:
    a high level presentation editor for creating a first high level presentation and adapted for modifying at least one of components and relationships between components represented in a created high level presentation to create one or more successive high level presentations;
    a concrete presentation generator for automatically generating a first concrete presentation from said first high-level presentation and for newly generating a successive concrete presentation from each successive high level presentation wherein said successive concrete presentation differs from said first concrete presentation and from an edited first concrete presentation;
    a concrete presentation editor for accepting user editing input and executing editing of a concrete presentation by performing two or more editing steps on said concrete presentation;
    an edit history component for storing a sequential edit history of said two or more editing steps in an edit history; and
    an edit history application component for automatically applying said edit history without further user input to perform said two or more editing steps on each said successive concrete presentation to generate an edited successive concrete presentation.

9. The system of claim 8 further comprising a display component for displaying said high level and concrete presentations to a user.

10. The system of claim 9 further comprising an edit preview component for displaying a preview of said two or more editing steps to said user.

11. The system of claim 8 wherein said edit history component is located at said concrete presentation editor.

12. The system of claim 11 wherein said edit history application component is located in said concrete presentation editor.

13. The system of claim 8 wherein said edit history application component is located in said concrete presentation editor.

14. The system of claim 8 wherein said concrete presentation editor further comprises means for specifying scope for each of said two or more editing steps based on user scope input.

15. The system of claim 8 wherein said edit history component further stores user-defined scope for said two or more editing steps.

16. The system of claim 8 wherein said edit history application component further comprises means for automatically modifying the edit history.

17. The system of claim 8 wherein said edit history application component is adapted for automatically applying said edit history to perform said two or more editing steps on at least one other newly generated successive concrete presentation without further user input.

* * * * *